United States Patent
Sievert et al.

(10) Patent No.: US 7,083,391 B2
(45) Date of Patent: Aug. 1, 2006

(54) METHOD AND DEVICE FOR DETECTING THE SPEED OF A PUMP

(75) Inventors: Holger Sievert, Ludwigsburg (DE); Juergen Hachtel, Moeckmuehl (DE); Guenther Hertlein, Fichtenberg (DE)

(73) Assignee: Robert Bosch GmbH, Stuttgart (DE)

( * ) Notice: Subject to any disclaimer, the term of this patent is extended or adjusted under 35 U.S.C. 154(b) by 191 days.

(21) Appl. No.: 10/662,827

(22) Filed: Sep. 15, 2003

(65) Prior Publication Data

US 2004/0126243 A1    Jul. 1, 2004

(30) Foreign Application Priority Data

Sep. 23, 2002  (DE)  ............... 102 44 203

(51) Int. Cl.
*F04B 49/06*  (2006.01)
(52) U.S. Cl. ........... 417/42; 417/44.2; 417/53; 702/138; 702/140; 702/142; 73/494
(58) Field of Classification Search ........... 417/42, 417/44.2, 53; 702/138, 140, 142, 145, 147; 73/494, 1.37
See application file for complete search history.

(56) References Cited

U.S. PATENT DOCUMENTS

| | | | | |
|---|---|---|---|---|
| 4,492,524 A | * | 1/1985 | Koch et al. | 417/18 |
| 4,679,488 A | * | 7/1987 | Krutz et al. | 91/1 |
| 4,965,713 A | * | 10/1990 | Hong et al. | 700/29 |
| 5,664,937 A | * | 9/1997 | Takahashi et al. | 417/22 |
| 5,678,521 A | * | 10/1997 | Thompson et al. | 123/447 |
| 6,276,134 B1 | * | 8/2001 | Matsuyama et al. | 60/425 |

FOREIGN PATENT DOCUMENTS

DE           41 33 269           4/1993

* cited by examiner

*Primary Examiner*—Tae Jun Kim
*Assistant Examiner*—Emmanuel Sayoc
(74) *Attorney, Agent, or Firm*—Kenyon & Kenyon LLP

(57) ABSTRACT

A method and a system for detecting the speed of a pump motor of a hydraulic pump system are provided, in which pump system a pump is driven by a pump motor to deliver hydraulic fluid into a pump reservoir. In accordance with the present invention, a pressure signal representing the fluid-delivery activity of the pump is detected, and the pressure peaks within this pressure signal identified. The speed of the pump motor is determined on the basis of the frequency or the time intervals of these pressure peaks.

6 Claims, 2 Drawing Sheets

METHOD AND DEVICE FOR DETECTING THE SPEED OF A PUMP

FIELD OF THE INVENTION

The present invention relates to a method and a system for detecting the speed of a pump motor.

BACKGROUND INFORMATION

It is known in the art to determine the speed of a pump motor using dedicated speed sensors. Given a clocked operation of a pump motor, the speed of the pump motor may also be ascertained, in the undriven phase, on the basis of the generating voltage of the pump motor. Such methods are used in the regulation of the pump motor within the framework of an electrohydraulic braking system, for example.

German Patent 41 33 269 describes a method for measuring the speed of a rotating part surrounded by a housing, in which a further signal that is a function of the speed is detected, and this further signal is filtered and digitalized, as well as Fourier-transformed twice. The speed is ascertained from the spectrum thus obtained, by evaluating the absolute maximum. A relatively great computing power is necessary to implement such a speed measurement because of the Fourier analysis used.

In general, known methods for detecting the speed of motors, particularly pump motors, tend to be relatively costly.

SUMMARY OF THE INVENTION

The present invention provide a method and a system for detecting the speed of a pump motor as simply and inexpensively as possible, by determining the pressure peaks within the pressure signal representing the delivery activity of the pump. In accordance with the present invention, the start-up of a pump motor may be reliably monitored, for example. The detection method according to the present invention universally applicable, i.e., independent of the type and the driving of the pump motor.

The detection method according to the present invention requires no correction to compensate for the temperature factor, and the method is substantially robust with respect to disturbing reflections between a pump and a reservoir acted upon by the pump.

In accordance with the present invention, it is advantageous to filter out high-frequency interferences in the pressure signal caused by the driven pump, using suitable filtering means. Similarly, it is advantageous to filter out low-frequency interferences in the pressure signal, particularly a DC voltage component, which stems from the rising pressure in the reservoir acted upon by the pump. A pressure signal that has been filtered of high-frequency and/or low-frequency interferences, may be further processed in a simple manner.

The pressure signal, particularly the filtered pressure signal, may be shaped by means of a comparator circuit to obtain a square-wave signal whose frequency is proportional to the speed of the pump motor. A square-wave signal thus obtained may be readily evaluated by calculation.

To implement the filters mentioned, suitable filtering means, e.g., a low-pass filter or a high-pass filter, may be used. Such filters may be made available inexpensively.

DETAILED DESCRIPTION

In a hydraulic pump system, a pump is driven by a pump motor to deliver a hydraulic fluid, via a pressure-media line, into a high-pressure reservoir. During this delivery, pressure peaks develop within the framework of a pressure signal in the pressure-media line and/or in the high-pressure reservoir, the time interval between the pressure peaks being a measure of the speed of the pump motor. The pressure signal is detected by a suitable sensor and converted into a corresponding current signal or voltage signal. A signal of this type, after an optional digitalization, is further processed in a computing device.

Figure 6:
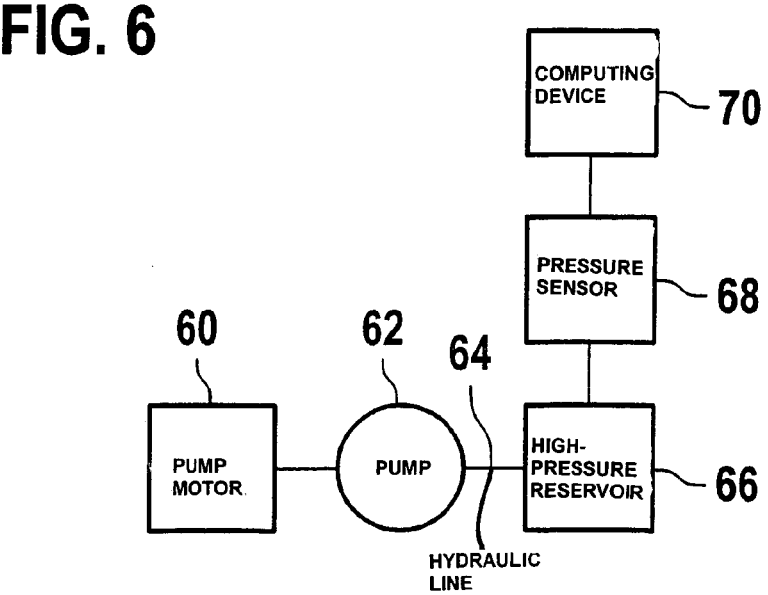
FIG. 6 shows a schematic block diagram of an example embodiment of the device according to the present invention.

A schematic representation of a hydraulic pump system in accordance with the present invention is shown in FIG. 6. Here, 60 designates a pump motor which drives a pump 62. Pump 62 in turn delivers hydraulic fluid via a hydraulic line 64 into a high-pressure reservoir 66. The pressure created in this high-pressure reservoir is detected by a pressure sensor 68 to obtain a pressure signal representing the pump activity, and the pressure signal is optionally converted into a corresponding electrical signal and digitalized. A signal of this type is supplied to a computing device 70, in which the further evaluation of the signal may be carried out.

Figure 1:
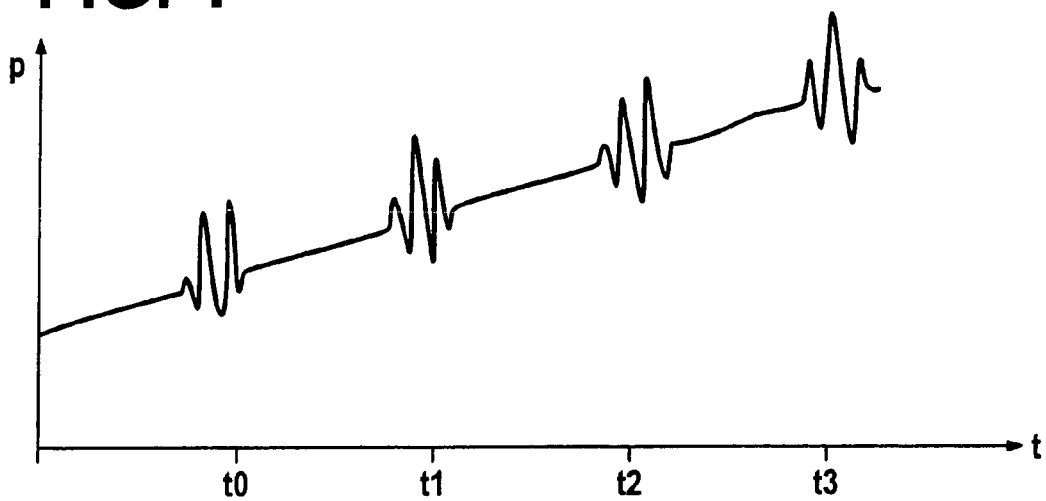
FIG. 1 shows a time graph illustrating the pressure characteristic in a pressure system acted upon by a pressure pump.

As shown in FIG. 1, the pressure signal p determined in the high-pressure reservoir 66, e.g., the voltage signal representing the pressure in the reservoir, is superimposed with high-frequency interferences due to reflections between the pump output and the high-pressure reservoir. Also superimposed on the signal is a DC voltage component stemming from the rising pressure in the reservoir 66 because of the action of the pump on the reservoir.

Figure 2:
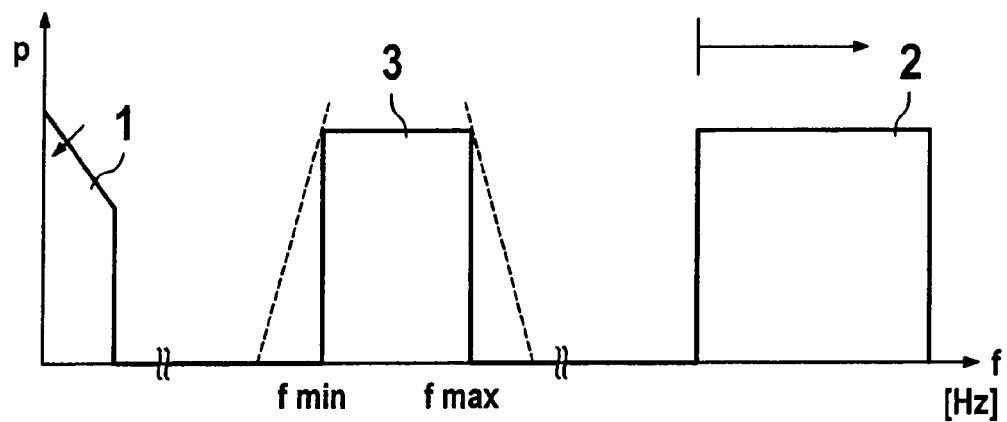
FIG. 2 shows a graph illustrating the spectral view of the pressure signal shown in FIG. 1.

As shown in FIG. 2, which shows a spectral view of the signal shown in FIG. 1, the pressure signal p is plotted against frequency f. The DC-voltage component of the pressure signal is designated here by 1, and the high-frequency interference component of the signal is designated by 2. The useful component of the signal, i.e., the component of the pressure signal actually used in the method according to the present invention, is provided with reference numeral 3.

Figure 3:
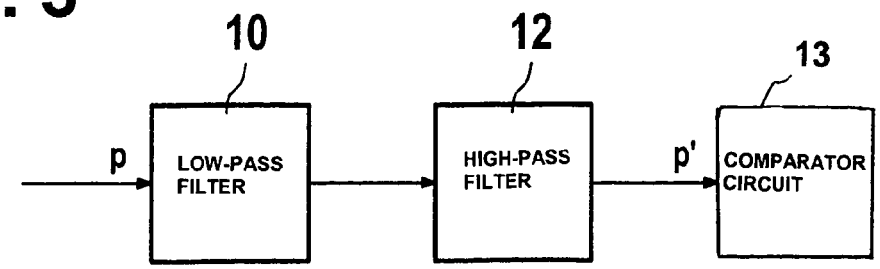
FIG. 3 shows a block diagram illustrating the filtering of the pressure signal shown in FIG. 1, in accordance with the present invention.
Figure 4:
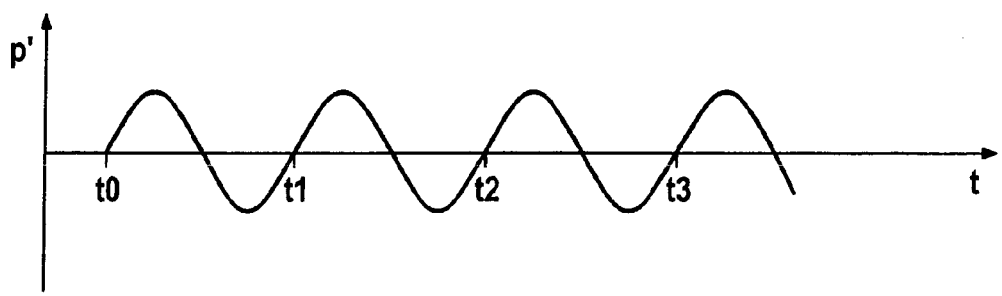
FIG. 4 shows a filtered time signal in accordance with the present invention, which signal is obtained after the filtering in accordance with FIG. 3.

As shown in FIG. 3, pressure signal p is first supplied to a low-pass filter 10 having a suitable cut-off frequency, which suppresses interfering high-frequency component 2 of the pressure signal. Subsequently, in a second step, the signal is conducted through a high-pass filter 12 having a suitable cut-off frequency, which filter suppresses the DC voltage component 1. Signal p' emerging from the high-pass filter represents a filtered time signal whose time characteristic is shown in FIG. 4. The curves of filters 10, 12 are represented by dotted lines in FIG. 2.

Figure 5:
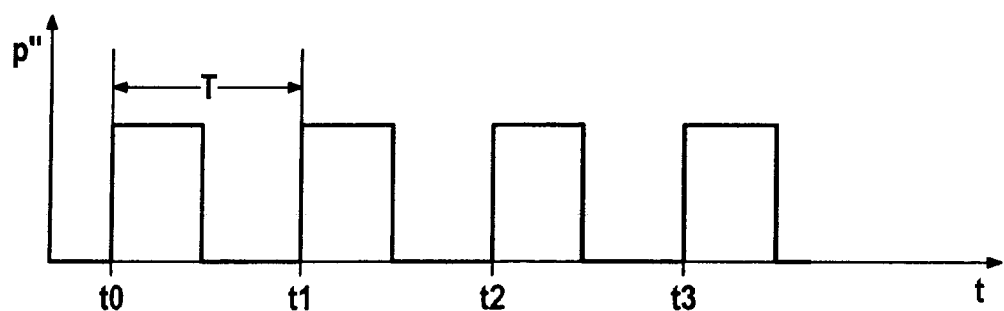
FIG. 5 shows a square-wave signal obtained after the signal shown in FIG. 4 has been further processed by a comparator.

Signal p' is supplied to a comparator circuit 13, which outputs a square-wave signal p" whose frequency is proportional to the speed of pump motor 60. A square-wave signal p" of this type is shown in FIG. 5, plotted against time. The period length of the signal is designated by T, and the respective period beginnings are designated by t0, t1, t2, etc. Frequency f, proportional to the pump motor speed, is yielded from f=1/T. The actual speed of pump motor 60 may be inferred directly by suitable normalization.

What is claimed is:

1. A method for detecting a speed of a pump motor of a hydraulic pump system, the pump system having a pump driven by the pump motor to deliver hydraulic fluid into a pump reservoir, comprising:
    detecting a pressure signal representing a fluid-delivery activity of the pump;
    determining pressure peaks within the pressure signal;
    determining the speed of the pump motor based on the frequency of the pressure peaks;
    filtering out high-frequency interference component of the pressure signal;
    filtering out low-frequency interference component of the pressure signal; and
    processing the pressure signal with a comparator circuit to obtain a square-wave signal, the square-wave signal having a frequency proportional to the pump motor speed.

2. A method for detecting a speed of a pump motor of a hydraulic pump system, the pump system having a pump driven by the pump motor to deliver hydraulic fluid into a pump reservoir, comprising:
    detecting a pressure signal representing a fluid-delivery activity of the pump;
    determining pressure peaks within the pressure signal;
    determining the speed of the pump motor based on the frequency of the pressure peaks;
    filtering out high-frequency interference component of the pressure signal;
    filtering out low-frequency interference component of the pressure signal, wherein the low-frequency interference component of the pressure signal is a DC-voltage component of the pressure signal; and
    processing the pressure signal with a comparator circuit to obtain a square-wave signal, the square-wave signal having a frequency proportional to the pump motor speed.

3. The method as recited in claim 1, wherein the pressure signal represents the pressure of the pump reservoir.

4. The method as recited in claim 2, wherein the pressure signal represents the pressure of the pump reservoir.

5. A device for detecting a speed of a pump motor of a hydraulic pump system, the pump system also having a pump driven by the pump motor to deliver hydraulic fluid into a pump reservoir, comprising:
    a sensor arrangement for detecting a pressure signal representing a fluid-delivery activity of the pump, and for determining pressure peaks within the pressure signal;
    a computing arrangement for determining the speed of the pump motor based on the frequency of the pressure peaks;
    a low-pass filter for filtering high-frequency interference component of the pressure signal;
    a high-pass filter for filtering low-frequency interference component of the pressure signal; and
    a comparator circuit for generating a square-wave signal from the filtered pressure signal, wherein a frequency of the square-wave signal is proportional to the speed of the pump motor.

6. The device as recited in claim 5, wherein the pressure signal represents the pressure of the pump reservoir.

* * * * *